United States Patent
Altenburger et al.

(10) Patent No.: US 10,136,098 B2
(45) Date of Patent: Nov. 20, 2018

(54) INTEGRITY VERIFICATION OF AN AUDIO-VISUAL DATA STREAM

(71) Applicant: INTERNATIONAL BUSINESS MACHINES CORPORATION, Armonk, NY (US)

(72) Inventors: Edward Altenburger, Winchester (GB); Benjamin A. Confino, Chandler's Ford (GB); Gordon D. Hutchison, Eastleigh (GB); Fenghui Jiang, Eastleigh (GB); Geoffrey S. Pirie, Nomansland (GB); Ashley Robertson, Chandler's Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/471,119

(22) Filed: Mar. 28, 2017

(65) Prior Publication Data
US 2018/0288362 A1    Oct. 4, 2018

(51) Int. Cl.
| | | |
|---|---|---|
| *H04N 9/80* | (2006.01) | |
| *H04N 5/913* | (2006.01) | |
| *H04N 5/95* | (2006.01) | |
| *G11B 27/00* | (2006.01) | |
| *H04N 5/765* | (2006.01) | |

(52) U.S. Cl.
CPC ... *H04N 5/913* (2013.01); *H04N 2005/91335* (2013.01)

(58) Field of Classification Search
USPC .......................... 386/260, 239, 248, 280, 285
See application file for complete search history.

(56) References Cited

U.S. PATENT DOCUMENTS

| | | | |
|---|---|---|---|
| 6,373,960 B1 | 4/2002 | Conover et al. | |
| 6,411,725 B1 | 6/2002 | Rhoads | |
| 6,674,874 B1 * | 1/2004 | Yoshida | G06T 1/0085 |
| | | | 380/205 |
| 7,222,235 B1 * | 5/2007 | Mitsui | G06F 17/211 |
| | | | 380/28 |

(Continued)

FOREIGN PATENT DOCUMENTS

| | | |
|---|---|---|
| CN | 102932650 A | 2/2013 |
| GB | 2425906 A | 11/2006 |

OTHER PUBLICATIONS

Pelly, et al., "UMID Watermarking for Managing Metadata in Content Production", 143rd Technical Conference and Exhibition, Nov. 4-7, 2001 (Abstract Only).

(Continued)

*Primary Examiner* — Daquan Zhao
(74) *Attorney, Agent, or Firm* — Michael Petrocelli, Esq.; Kevin P. Radigan, Esq.; Heslin Rothenberg Farley & Mesiti, P.C.

(57) ABSTRACT

Methods and systems are provided for integrity verification of an audio-visual data stream. The method includes inserting a watermark into a frame of the visual data stream or into an audio window of a corresponding audio data stream, where the watermark includes: a hash code of the previous frame of the visual data stream and a hash code of the audio window of the audio data stream, and where the audio window corresponds in time to the previous frame of the visual data stream.

20 Claims, 10 Drawing Sheets

(56) References Cited

U.S. PATENT DOCUMENTS

| | | |
|---|---|---|
| 8,483,388 B2 | 7/2013 | Keidar et al. |
| 2012/0096564 A1 | 4/2012 | Li |
| 2015/0334459 A1 | 11/2015 | Oh et al. |
| 2016/0210444 A1 | 7/2016 | Epstein et al. |
| 2016/0283920 A1 | 9/2016 | Fisher et al. |

OTHER PUBLICATIONS

Simitopoulos, et al., "Compressed-Domain Video Watermarking of MPEG Streams", Proceedings, 2002 IEEE International Conference on Multimedia and Expo, Aug. 26-29, 2002 (Abstract Only).

Gosh, et al., "Watermarking Compressed Video Stream Over Internet", The 9th Asia-Pacific Conference on Communications, APCC 2003, Sep. 21-24, 2003, (Abstract Only).

Abd-Elrahman, et al., "Hash Chain Links Resynchronization Methods in Video Streaming Security: Performance Comparison", Journal of Multimedia, 2011, (12 pages).

Mel, et al., "The NIST Definition of Cloud Computing," National Institute of Standards and Technology, Information Technology Laboratory, Special Publication 800-145, Sep. 2011, (pp. 1-7).

Zhao, et al., "A Novel Video Authentication Scheme with Secure CS-Watermark in Cloud", 2015 IEEE International Conference on Multimedia Big Data (BigMM), Apr. 20-22, 2015, (Abstract Only).

Gipp, et al., "Securing Video Integrity Using Decentralized Trusted Timestamping on the Bitcoin Blockchain", Tenth Mediterranean Conference on Information Systems (MCIS). Paphos, Cyprus, Sep. 2016, (10 pages).

Acronis, "Acronis Blockchain Technology Initiative", http:www.acronis.com/en-in/business/blockchain-notary/, 2016, (7 pages).

\* cited by examiner

INTEGRITY VERIFICATION OF AN AUDIO-VISUAL DATA STREAM

BACKGROUND

The present invention relates to audio-visual data streams, and more specifically, to integrity verification of audio-visual data streams.

The integrity of audio-visual data streams needs to be verified in a range of situations. For example, with audio-visual film in the form of a police interview or closed-circuit television (CCTV) footage, the ability to tell that, neither the audio or video has been cut, edited or synced incorrectly is a valuable feature if the film is used in evidence later.

The verification of integrity is particularly useful in a standard-looking file format that is transmittable, storable and playable with standard software.

SUMMARY

According to one or more an aspects of the present invention, a computer-implemented method is provided for integrity verification of an audio-visual data stream. The method includes inserting a watermark into a frame of the visual data stream and/or into an audio window of a corresponding audio data stream. The watermark includes a hash code of the previous frame of the visual data stream and a hash code of the audio window of the audio data stream, where the audio window corresponds in time to the previous frame of the visual data stream.

Further methods, as well as systems and computer program products, are also described and may be claimed herein. Further, services relating to one or more aspects are also described and may be claimed herein.

Additional features and advantages are realized through the techniques disclosed herein. Other embodiments and aspects of the invention are described in detail herein, and are considered a part of the claimed aspects.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described herein, by way of example only, with reference to the drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide a technique in which the integrity of an audio-visual stream can be verified using a chain of nested hash codes hidden in a set of digital watermarks. Block chain techniques are used to provide verifiably authentic video sequences, in a way that uses standard file formats and cross verifies audio and video.

A separate chain of hash codes is maintained for visual frames of a video or visual data stream and corresponding audio windows in an audio data stream. These hash codes are stored by including them both in a watermark that may be applied to one or both of video data stream and the audio data stream. Each hash code may be formed over a time framed set of audio/image data and also the hash code of the related other audio/image data thereby tying the two together.

Software, or software with hardware assistance, provides a hash code that depends on a video frame image. An analogous technique is applied to the audio stream relating to the video stream using corresponding windows of audio time. For example, for 20 frames per second video, a window of ½0th of a second of the audio digital signal is used. A hash code is generated for the content of the audio window.

The hash codes of the video frame and audio window are combined in a watermark in the next video frame image which in turn has its hash code calculated on the image after the watermark is applied. In this way, the video stream may be watermarked and each video frame witnesses the integrity of its predecessor and cross-relates to the corresponding previous audio window.

The audio stream may also be audio watermarked with a watermark including the hash code of the previous audio window and the hash code of the corresponding previous video frame.

For each video frame and audio window the watermarks include elements of the hash code from the previous audio window and previous video frame thus cross pollinating the audio and video verification chain and locking the audio and video synchronization in a verifiable way.

Figure 1:
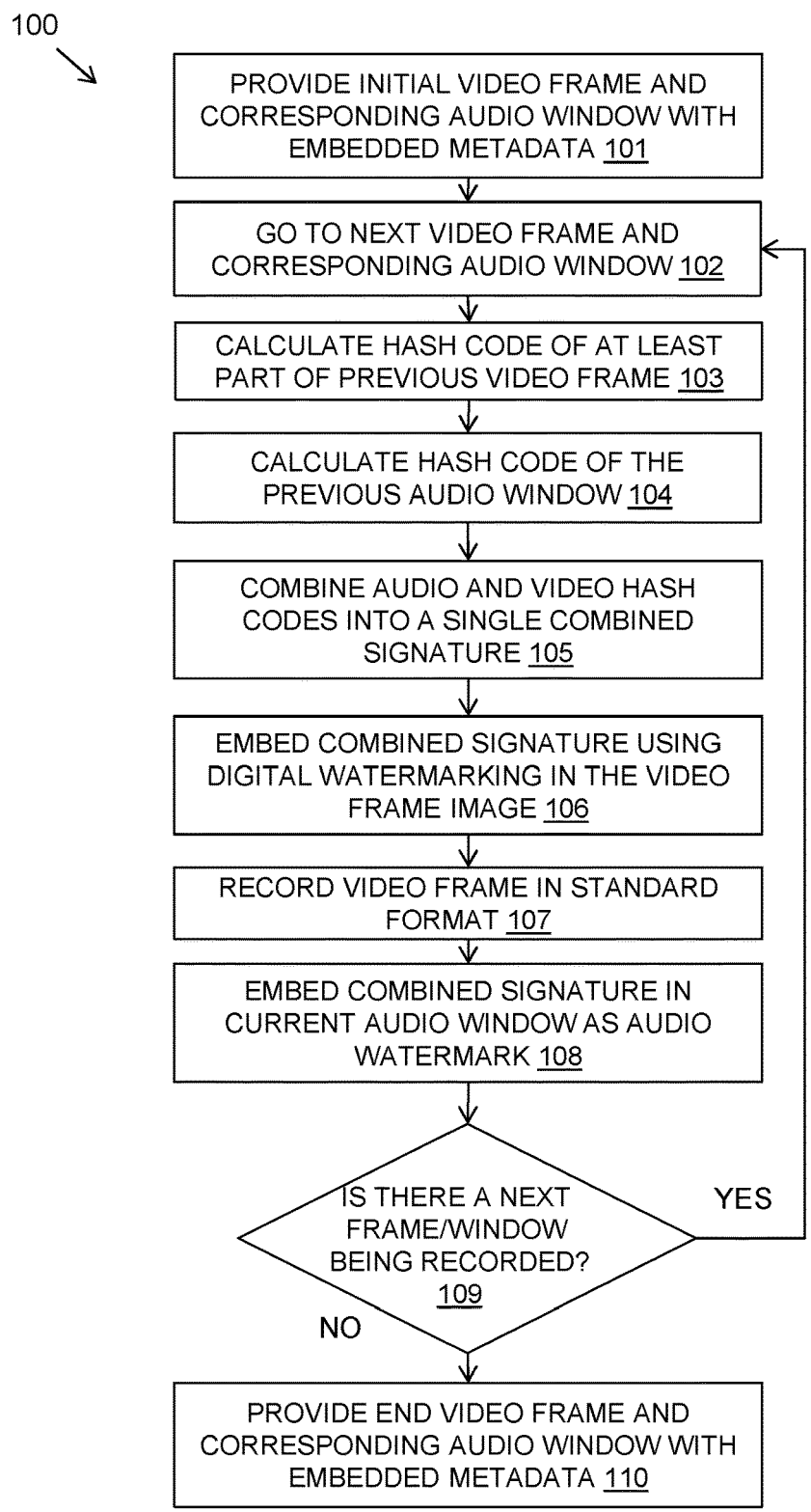
FIG. 1 is a flow diagram of one embodiment of a method, in accordance with one or more aspects of the present invention.

Referring to FIG. 1, a flow diagram 100 shows an example embodiment of an aspect of the described method. An audio-visual stream in the form of a video or visual data stream with a corresponding audio data stream is provided to be processed.

The processing of the method may be carried out before transmission or storage or the recorded audio-visual stream. The processing may be carried out at a video and audio capturing device such as a video camera. Alternatively, the processing may be carried out by a computing system either local to the capturing device or remotely provided, for example as a cloud service, via a trusted transmission.

The processing is carried out before the audio-visual signal leaves a domain with a certain level of trust and passes into a domain with a lesser degree of trust or verifiability. For example, a lesser degree of trust may be a third party cloud storage service or an untrusted network across which transmission is made.

Video streams may take many different formats such as Windows™ Media File Format (Windows is a trade mark of Microsoft Corporation), RealMedia™ (RealMedia is a trade mark of RealNetworks, Inc.), QuickTime™ (QuickTime is a trade mark of Apple, Inc.), MPEG4 (Moving Picture Experts Group 4), Adobe Flash™ (Adobe Flash is a trade mark of Adobe Systems Incorporated), or Hypertext Transfer Protocol (HTTP) streaming, etc. Each format has its own detailed specification, and the data formats may vary widely. Storing additional metadata in the image itself as a watermark is advantageous, as it will survive lossless format conversion.

At an abstract level, digital video includes a series of orthogonal bitmap digital images displayed in rapid succession at a constant rate. In the context of video these images are called frames. The rate at which frames are displayed is measured in frames per second (FPS). Since every finally presented frame is an orthogonal bitmap digital image, it includes a raster of pixels. The video data stream and corresponding audio data stream are processed together with each audio window being of time corresponding to a video frame. Transmission technologies make use of frame-to-frame relationships to further compress the amount of data sent.

Optionally, an initial frame of the video recording sequence may be provided 101, for example by camera firmware, and may include useful embedded metadata such as, for example, camera serial number, timestamp, the final hash code from when the camera was last recording, a user entered string (such as interviewer, case number, operator name etc.), a cryptographic digital signature in string form, global positioning system (GPS) location, orientation, etc. The corresponding initial audio window may also have embedded metadata.

This additional metadata may be embedded using a similar approach to standard digital watermarking techniques that embed copyright information etc., as there is no need to verify a previous frame of the initial frame. Alternatively, it may be provided in some cases, such as police interview cameras, as an artificially generated initial frame that can be seen by a human viewer.

The method may go 102 to the next video frame and corresponding audio window in the video data stream and audio data stream. A hash code may be calculated 103 of at least part of the previous video frame. At the start of the processing, the previous video frame may be the initial video frame and as the method loops for a next frame processing, the previous video frame may be the previous watermarked video frame.

A hash code may be generated by a function that can be used to map data of arbitrary size to data of fixed size. A typical data hash function will process an input file to produce an alphanumeric string unique to the data file. Should the file be modified, such as if one or more bit changes occur within this original file, the same hash process on the modified file will produce a different alphanumeric with an acceptably high degree of probability. Through this method, a trusted source can calculate the hash of an original data file and subscribers can verify the integrity of the data. The subscriber simply compares a hash of the received data file with the known hash from the trusted source.

In one embodiment, the hash code may be generated for the entire video frame. In a second embodiment, which is described further in relation to FIG. 2, the hash code may be generated for only part or parts of the video frame that have changed to accommodate compression techniques that use delta encoding.

A hash code may also be calculated 104 for the previous audio window that corresponds to the previous video frame for which the hash code is generated 103.

The calculated hash codes of the previous video frame and the previous audio window may be combined 105 into a single signature, which may be embedded 106 using digital watermarking in the current video frame's image and the video frame may be stored 107 in a standard format.

A digital watermark is a form of marker covertly embedded in a noise-tolerant signal such as an audio, video or image data. Watermarking is the process of hiding digital information in a carrier signal in a way that is difficult to remove. If the signal is copied, then the information is also carried in the copy. Digital watermarks may be used to verify the authenticity or integrity of the carrier signal or to show the identity of its owners. Digital watermarking conceals information within digital data such that it cannot be detected without dedicated software. There are many known methods of digital watermarking including spatial domain techniques and frequency domain techniques.

Optionally, the combined signature of the hash code of the previous video frame and the hash code of the previous audio window may also be embedded 108 in the current audio frame as an audio watermark which may be incorporated into the recorded video standard format. Many audio watermarking techniques are known, for example, based on the limitations of perceptual properties of the human auditory system including least significant bit encoding, phase coding, spread spectrum, patchwork coding, echo coding, and noise gate technique.

There may be situations in which watermarking is only applied to the video data stream or only applied to the audio data stream; however, this will still tie the audio and video together to ensure integrity due to the inclusion of both video and audio hash codes in the watermarking.

This method is analogous to that of a typical block chain that maintains a continuously-growing list of ordered blocks with each block containing a hash code and a link to a previous block over which that hash code was calculated. By design, block chains are inherently resistant to modification of the data and once recorded, the data in a block cannot be altered retroactively once the data's records are embedded within the block chain and followed by subsequent blocks.

The method may determine 109 if there is a next video frame and audio window being recorded. If so, the method may loop to process 102 the next video frame and audio window. If there are no further frames, the method may end or there may be a closing frame provided 110 with a corresponding audio window with embedded metadata.

A closing frame may be inserted as the last frame of a recording sequence that contains the hash code of the last 'real' frame, metadata similar to the first frame, and, optionally, a digital signature using a private key stored (but irretrievable) in the capturing device. This would prevent someone from reprocessing the entire file.

Another technique that prevents reprocessing the entire file is that watermarking introduces watermarks into digital files that are difficult to detect fully and/or remove unless one has the original data used to produce the watermark.

The trusted device that applies the method may be connected to the network using High-bandwidth Digital Content Protection (HDCP) connectivity providing Digital Rights Management (DRM) for High-definition Multimedia Interfaces (HDMI) and other digital standards interfaces. The protocol allows for connection of a video device with a data link that cannot be hacked into to extract or interfere with the video stream. The encrypted connection is provided between a content outputting device and a receiving device.

Figure 2:
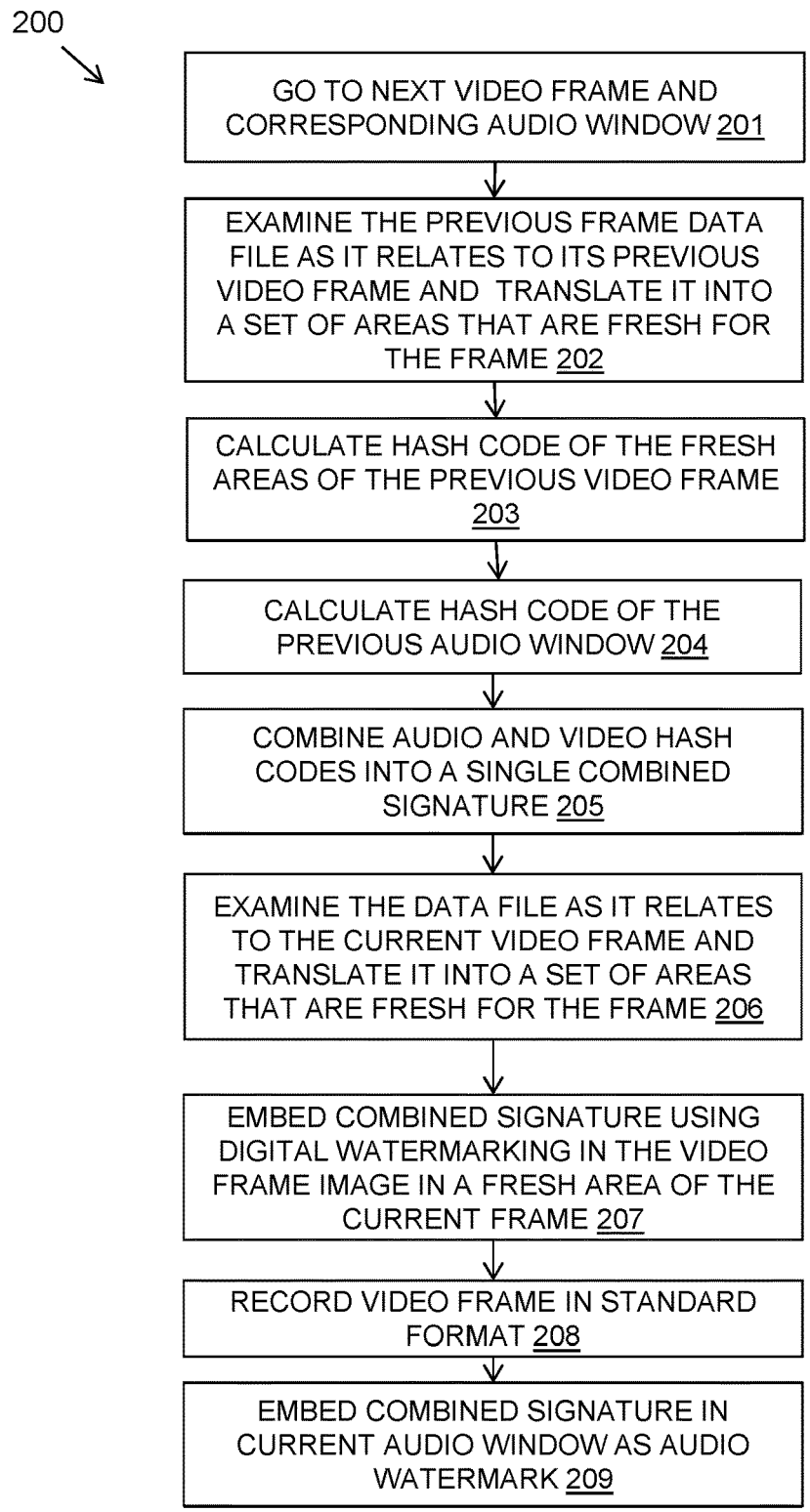
FIG. 2 is a flow diagram of another embodiment of certain steps of the method of FIG. 1, in accordance with one or more aspects of the present invention.

Referring to FIG. 2, a flow diagram 200 shows an alternative embodiment of steps 102 to 109 of FIG. 1.

Some video compression schemes typically operate on square-shaped groups of neighboring pixels, often called macroblocks. These pixel groups or blocks of pixels are compared from one frame to the next, and the video compression codec sends only the differences within those blocks. Therefore, the described method is adapted to accommodate compression schemes by generating a hash code of only the changed portions of the video frame.

The hash function that is being performed on a video image frame may be performed against the part of the image with "fresh" data in the frame, where freshness is a feature of the data format used to store the frame. For example, if the algorithm used to store the image only stores the delta between the current frame and the previous frame or a predicted current frame when motion vectors are applied, the function will only be applied to the delta.

The method may go 201 to the next video frame and may examine 202 the data file as it relates to the previous video frame and may translate it into a set of areas that are fresh for the frame. These areas may be called the source fresh area set and relates to the difference between the previous frame and its previous frame. Each area may be described by two points such as a lower-left and upper-right co-ordinate or by some other means.

The hash code of the fresh areas may be calculated 203 for the previous video frame. A hash code of the previous audio window may also be calculated 204. The audio and video hash codes may be combined 205 into a single combined signature.

The method may examine 206 the data file as it relates to the current video frame and may translate it into a set of areas that are fresh for the current frame. These areas may be called the target fresh area set. Each area may be described by two points such as lower-left and upper-right co-ordinates or by some other means.

The combined signature may be embedded 207 using a digital watermark in the current video frame in a fresh area of the current frame. The video frame may be recorded 208 in standard format. The watermark may be calculated using the metadata and knowledge of the target fresh area set such as size and number of image sub-areas. The watermark is applied to the target frame and thus to the data stream for the target frame—without needlessly impacting the video stream's compressibility.

Optionally, the combined signature may also be embedded 209 in the current audio window as an audio watermark.

The technique applies a varying digital watermark to an audio-visual stream that takes into account the compression techniques used in the transmission of the audio-visual stream. The input to the watermark is constrained to the audio/visual data that would have been transmitted within a recent time window. The application of the watermark is limited to the subset of the audio-visual field of display that would have required data to be transmitted for the frame that the watermark is being applied to and which can be used as base medium for the varying watermark without additional areas of the frame having to be sent.

The watermarking is stored wholly within and applied to the portion of the subset of the video image frame for which fresh data is present for inclusion in this particular frame or sequence. Thus all the metadata that is desired to be stored in the watermark on this video image frame is contained in and applied to only parts of the video image frame that have changed in this frame and thus have image data in the file stored directly for this frame.

The hash code and watermarks can thus be calculated and applied respectively with a minimum impact to the effectiveness of the compression scheme used in the transmission of the audio video signal.

The method allows for efficient calculation of a function of the video stream and storing of metadata within it via watermarking in a form that makes use of and does not impact the ability to compress the video using frame to frame differences such as in motion compression as is commonly used in video file formats.

Although the processing occurs in the visual sphere (image processing and watermarking) and can thus be done using standard file formats that can be stored and transmitted without custom tools, the processing takes into account the scope of the data file that is being sent/stored fresh for this particular video image frame and so does not needlessly impact the compression of the data used during storage and transmission.

In the embodiments shown in FIG. 1 and FIG. 2, the watermarking may also include additional information such as obfuscated copyright.

In operation, the described method may commence recording and, optionally, a user may enter a string for inclusion the initial frame of the recording. The user may also provide a digital signature for inclusion the initial frame. This might be useful as, if conventionally provided by operatives, this protects against claims that the recording was made by someone it was not.

The recording may be set in operation and may provide manufactured initial video frame and tone with desired metadata embedded as described above.

The method may then loop to process each frame of the video stream and associated audio window of the audio stream to calculate the hash codes and insert the watermarks in the video stream and/or the audio stream.

Thus block chain type integrity protection is provided for video that is of a standard format with all the advantages that provides. It would not be obvious that editing the video, or for example dubbing out a short audio sequence, would be easy to detect.

Figure 3:
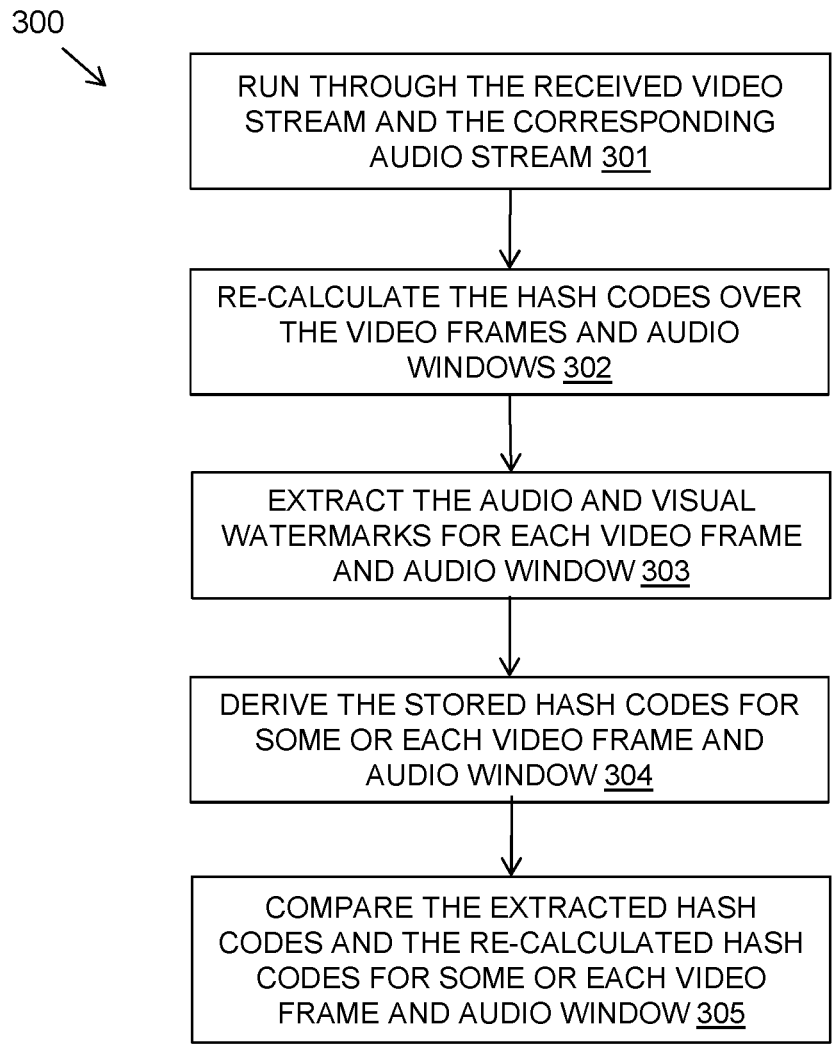
FIG. 3 is a flow diagram of one embodiment of a further method, in accordance with one or more aspects of the present invention.

Referring to FIG. 3, a flow diagram 300 shows an example embodiment of a further aspect of the method for verifying a received or stored audio-visual stream. The method may be provided in the form of computer software.

The received or stored video stream and corresponding audio stream may be run through 301 and the hash codes of the video frames and audio windows may be re-calculated 302 using the methods as described in relation to FIGS. 1 & 2.

The watermarks may be extracted 303 from the video stream for each video frame and/or the audio stream for each audio window depending on whether the watermarking was embedded in either the video stream or the audio stream, or both. The hash codes stored in the watermarks may be derived 304 for each video frame or audio window.

The extracted hash codes may be compared 305 to the re-calculated hash codes for each video frame or audio window.

If the hash code results are the same, the systems involved may have an appropriate degree of confidence to the integrity of the received data. On the other hand, if the hash results are different, they may conclude that the received data file has been altered.

The described method proves the integrity of the video stream in a way that is not destroyed by standard lossless transmission, storage and even, internally to a remaining video sequence truncation.

Figure 4A:
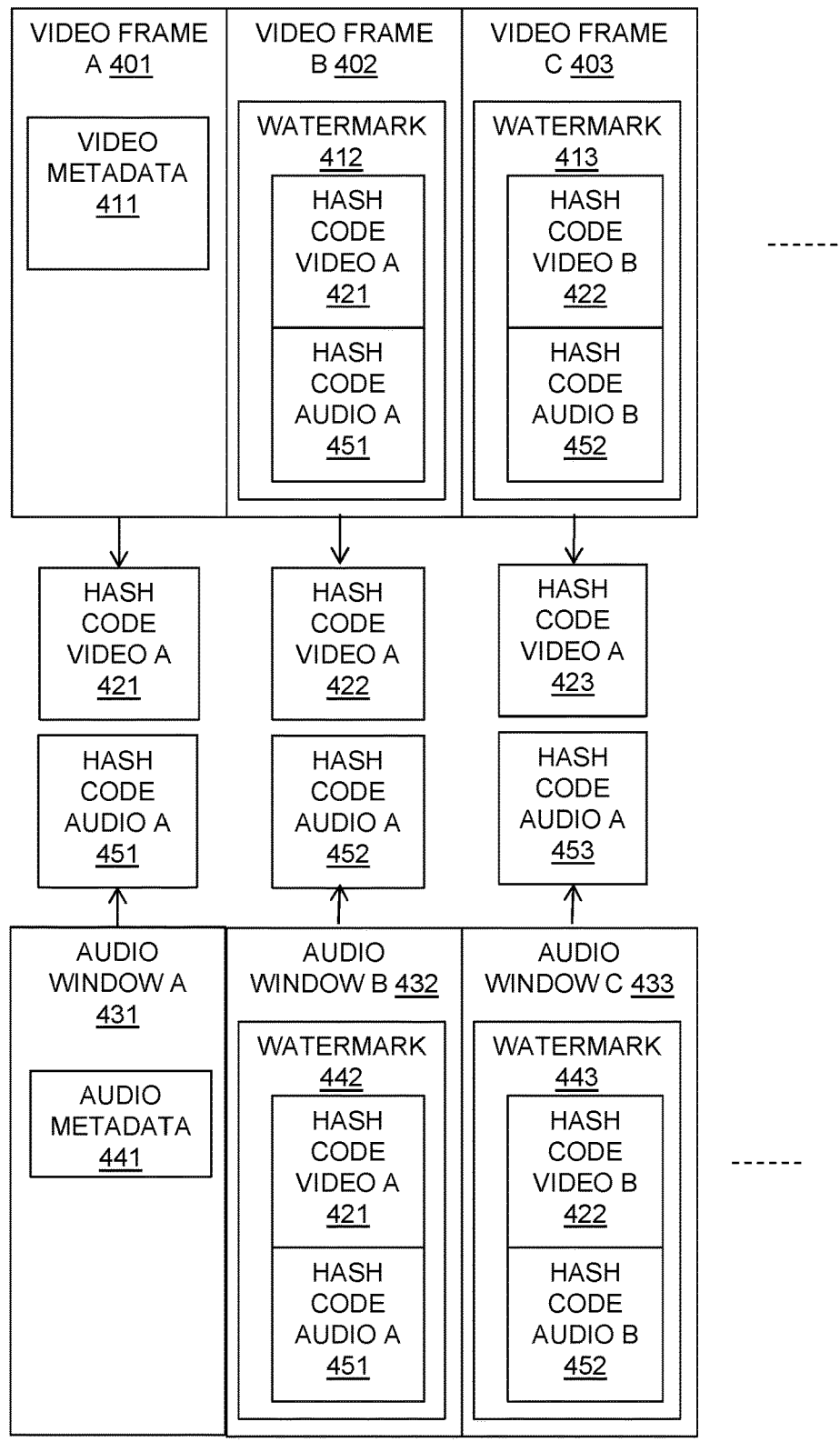
FIGS. 4A & 4B are schematic diagrams illustrating a method, in accordance with one or more aspects of the present invention.
Figure 4B:
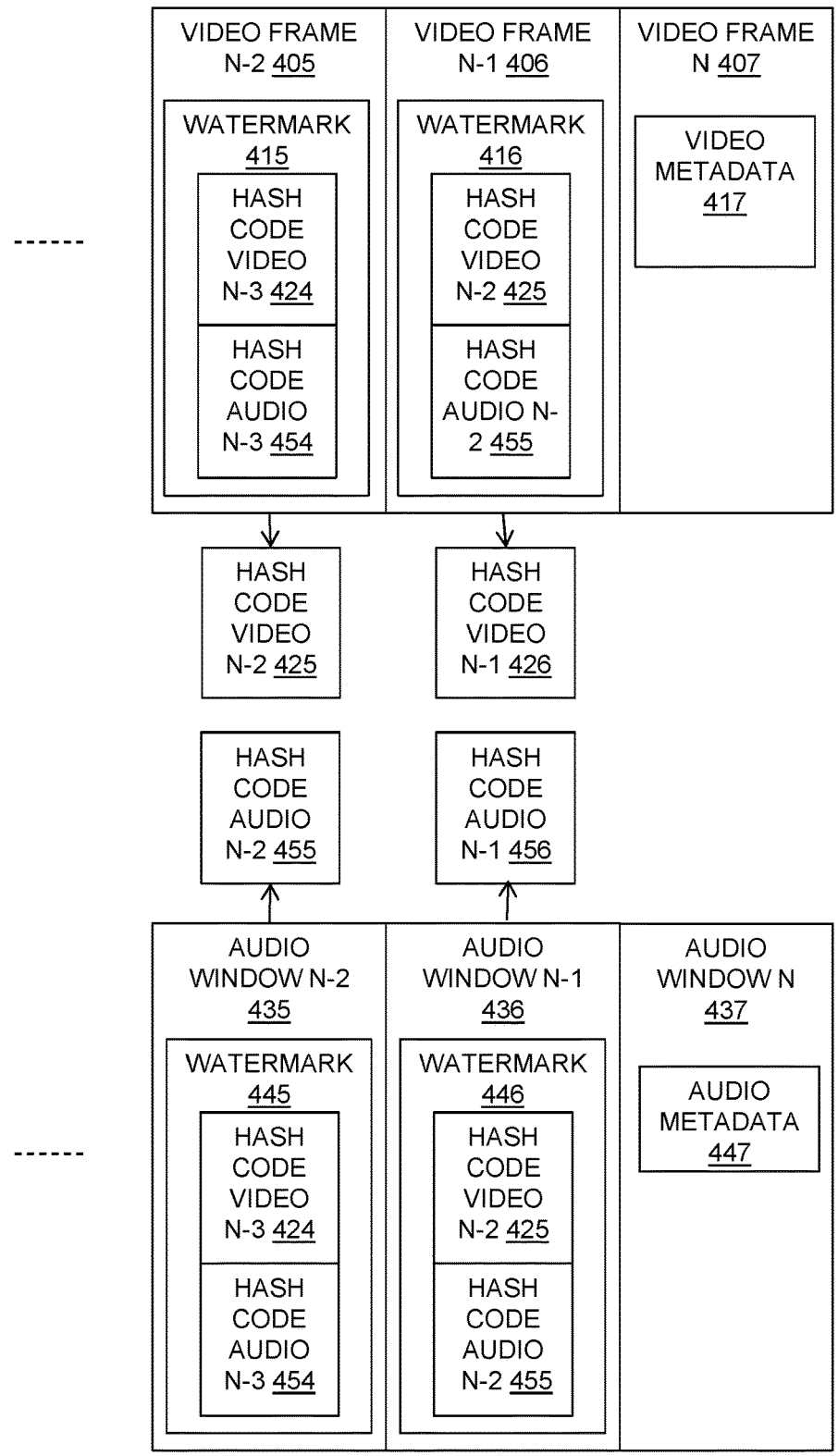

Referring to FIGS. 4A & 4B, schematic diagrams illustrate the described method.

FIG. 4A shows a video data stream formed of video frames 401-407 and a corresponding audio data stream formed of audio windows 431-437 with each of the audio windows being of a length of time between video frames. An initial video frame A 401 is shown which may include video metadata 411 and a corresponding initial audio window A 431 which may include audio metadata 441.

The method may generate a hash code 421 of at least part of the video frame A 401 and a hash code 451 of the audio window A 431. A watermark 412 may be embedded in the video frame B 402 which combines the hash code 421 of the previous video frame A 401 and the hash code 451 of the corresponding audio window A 431.

A watermark 413 may be embedded in the video frame C 403 which combines the hash code 422 of the previous video frame B 402 and the hash code 452 of the corresponding audio window B 432. This method may repeat through the video frames of the video stream as it is being recorded.

The continuation of the method is shown in FIG. 4B wherein the closing video frame N 407 is shown with video metadata 417 and a corresponding closing audio window N 437 is shown with audio metadata 447.

A watermark 415 may be embedded in the video frame N-2 405 which combines the hash code 424 of the previous video frame N-3 and the hash code 454 of the corresponding audio window N-3.

A watermark 416 may be embedded in the video frame N-1 406 which combines the hash code 425 of the previous video frame N-2 405 and the hash code 455 of the corresponding audio window N-2 435.

If watermarking is also carried out in the audio stream, an audio watermark 442 may be embedded in the audio window B 432 which combines the hash code 421 of the previous video frame A 401 and the hash code 451 of the corresponding audio window A 431.

An audio watermark 443 may be embedded in the audio window C 433 which combines the hash code 422 of the previous video frame B 402 and the hash code 452 of the corresponding audio window B 432. This method may repeat through the audio windows of the audio stream as it is being recorded.

An audio watermark 445 may be embedded in the audio window N-2 435 which combines the hash code 424 of the previous video frame N-3 and the hash code 454 of the corresponding audio window N-3.

An audio watermark 446 may be embedded in the audio window N-1 436 which combines the hash code 425 of the previous video frame N-2 405 and the hash code 455 of the corresponding audio window N-2 435.

Figure 5A:
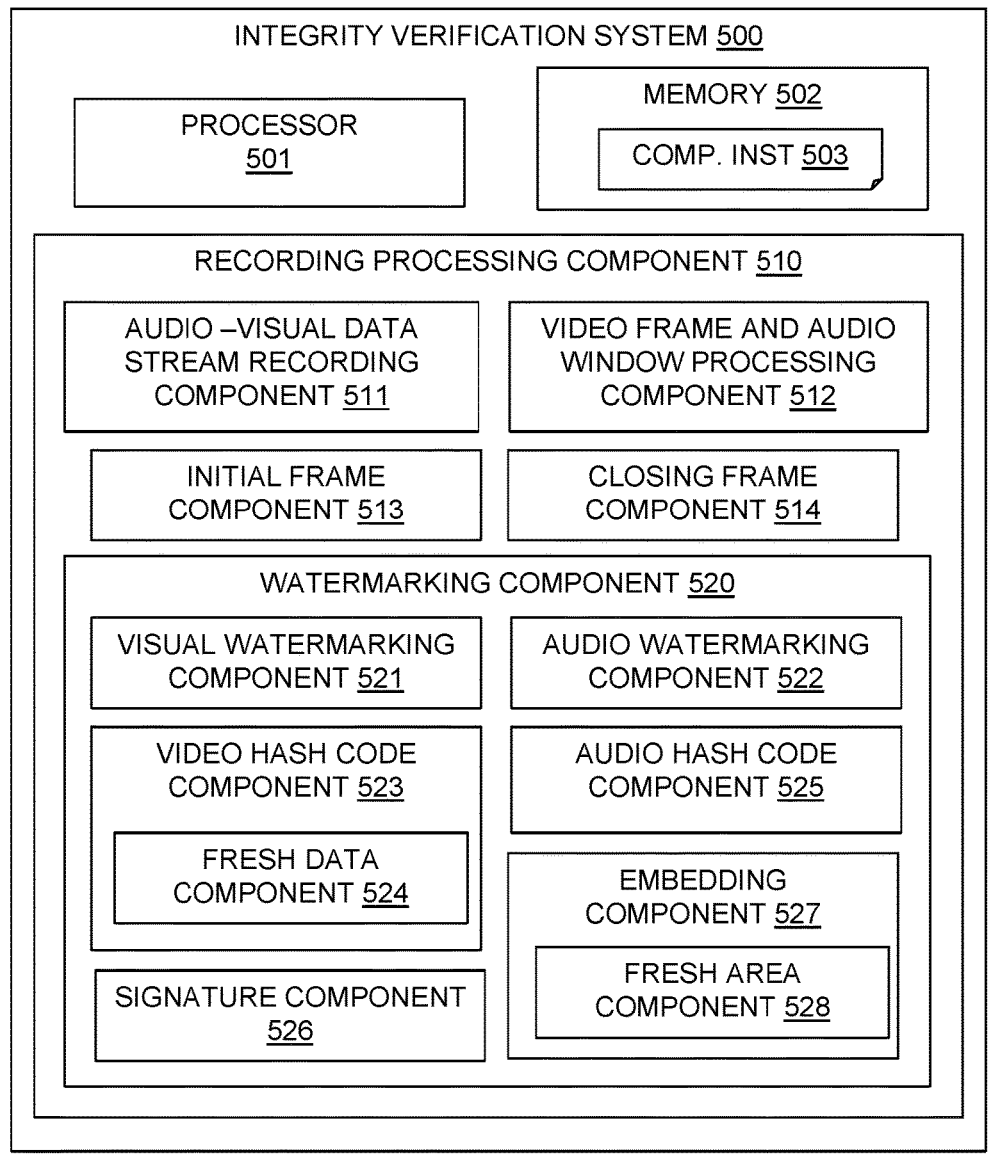
FIGS. 5A & 5B are block diagrams of example embodiments of a system, in accordance with one or more aspects of the present invention.
Figure 5B:
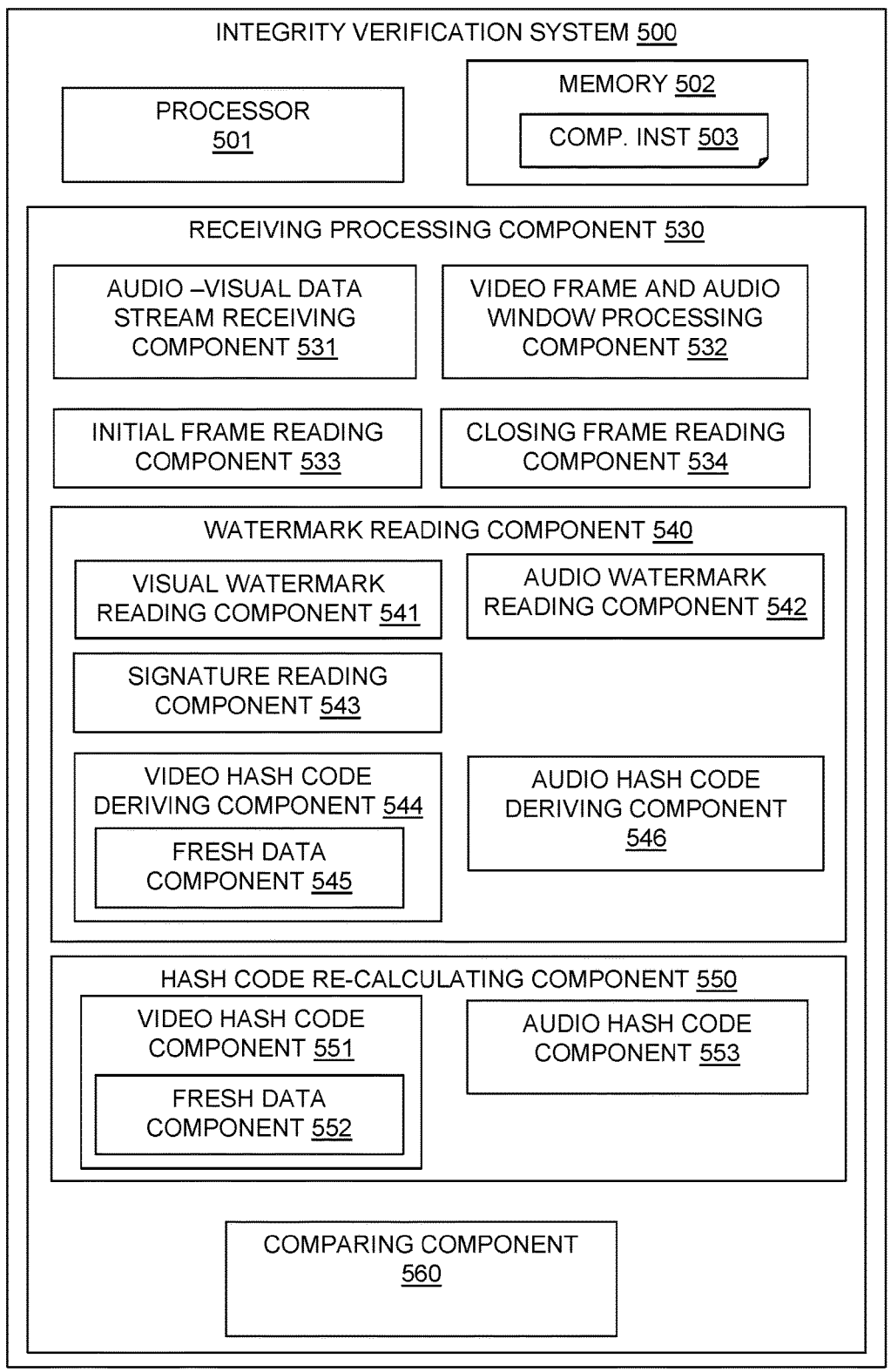

Referring to FIGS. 5A & 5B, an integrity verification system 500 may be provided. The integrity verification system 500 shown in FIG. 5A may include a recording processing component 510 for adding the watermarking to the audio-visual stream as it is recorded or before it is stored and transmitted to a less trust-worthy domain, thereby providing a trusted source of the media. The recording processing component 510 may be provided as part of an integrity verification system 500 at a capturing device or at a computing system either local to the capturing device or remotely provided, for example as a cloud service, via a trusted transmission from the capturing device.

The integrity verification system 500 shown in FIG. 5B may include a receiving processing component 530 for verifying the watermarking to the audio-visual stream as it is received. An integrity verification system 500 may include both the recording processing component 510 and the receiving processing component 530.

The integrity verification system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

Referring to FIG. 5A, the integrity verification system 500 may include a recording processing component 510 with an audio-visual data stream recording component 511 which may provide the raw data as it is recorded or received from a capturing device and a video frame and audio window processing component 512 for processing each video frame and audio window.

The recording processing component 510 may include an initial frame component 513 for providing an initial frame in a recording with metadata, which may be received from the recording device and may be input by a user. The recording processing component 510 may include a closing frame component 514 for providing a closing frame in a recording with metadata.

The recording processing component 510 may include a watermarking component 520 including a visual watermarking component 521 for embedding a watermark into frames of the video data stream, and optionally an audio watermarking component 522 for embedding a watermark into audio windows of the audio data stream.

The watermarking component 520 may include a video hash code component 523 for generating a hash code of a video frame. In one embodiment, the video hash code component 523 may include a fresh data component 524 for determining a hash code of an area of fresh data of a video frame.

The watermarking component 520 may include an audio hash code component 525 for generating a hash code of an audio window.

The watermarking component 520 may include a signature component 526 for combining the video frame hash code and the audio window hash code into a signature and an embedding component 527 for embedding the signature as a watermark using the visual watermarking component 521 and/or the audio watermarking component 522. In one embodiment, the embedding component 527 may include a fresh area component 528 for determining a fresh data area of a current video frame in which the embedding component 527 may embed the watermark.

Referring to FIG. 5B, the integrity verification system 500 may include a receiving processing component 530 including an audio-visual data stream receiving component 531 for receiving an audio-visual data stream and a video frame and audio window processing component 532 for processing the received individual video frames and audio windows.

The receiving processing component 530 may include an initial frame reading component 533 for reading metadata from an initial frame and a closing frame reading component 534 for reading metadata from a closing frame in a recording.

The receiving processing component 530 may include a watermark reading component 540 including a visual watermark reading component 541 for reading a watermark from the video frames of the video data stream and, optionally, an audio watermark reading component 542 for reading a watermark from the audio windows of the audio data stream if this is also watermarked.

The watermark reading component 540 may include a signature reading component 543 for reading a signature from the watermarks and a video hash code deriving component 544 for deriving a video hash code from the signature and an audio hash code deriving component 546 for deriving an audio hash code from the signature. In one embodiment, the video hash code deriving component 544 may include a fresh data component 545 for deriving the video hash code relating only to the fresh data of a video frame.

The receiving processing component 530 may include a hash code re-calculating component 550 including a video hash code component 551 for re-calculating the hash codes of received video frames and an audio hash code component 553 for re-calculating the hash codes of audio windows. In one embodiment, the video hash code component 551 may include a fresh data component 552 for re-calculating the video hash codes for fresh data of a video frame.

The receiving processing component 530 may include a comparing component 560 for comparing the extracted hash codes of the video frames and the audio windows with the re-calculated hash codes of the corresponding video frames and the audio windows to determine the integrity of the receiving audio-visual stream Those skilled in the art will note from the description provided herein that, according to an aspect of the present invention, there is provided a computer-implemented method for integrity verification of an audio-visual data stream. The method includes: inserting a watermark into a frame of the visual data stream and/or into an audio window of a corresponding audio data stream, wherein the watermark includes a hash code of the previous frame of the visual data stream and a hash code of the audio window of the audio data stream, where the audio window corresponds in time to the previous frame of the visual data stream.

According to a further aspect of the present invention there is provided a computer-implemented method for integrity verification of an audio-visual data stream, including: running through a visual data stream and a corresponding audio data stream; extracting a watermark in a frame of the visual data stream and/or an audio window of a corresponding audio data stream; deriving from the watermark a hash code of the previous frame of the visual data stream and a hash code of the audio window of the audio data stream wherein the audio window corresponds in time to the previous frame of the visual data stream; and comparing the derived hash codes with re-calculated hash codes from the visual data stream and the audio data stream.

According to a further aspect of the present invention there is provided a system for integrity verification of an audio-visual data stream, including: a processor and a memory configured to provide computer program instructions to the processor to execute the function of components; a watermarking component for inserting a watermark into a frame of the visual data stream and/or into an audio window of a corresponding audio data stream, wherein the watermarking component includes: a hash code of the previous frame of the visual data stream and a hash code of the audio window of the audio data stream wherein the audio window corresponds in time to the previous frame of the visual data stream.

According to a further aspect of the present invention there is provided a system for integrity verification of an audio-visual data stream, including a receiving processing component including: an audio-visual data stream receiving component for running through a visual data stream and a corresponding audio data stream; a watermark reading component for extracting a watermark in a frame of the visual data stream and/or an audio window of a corresponding audio data stream and deriving from the watermark a hash code of the previous frame of the visual data stream and a hash code of the audio window of the audio data stream wherein the audio window corresponds in time to the previous frame of the visual data stream; a hash code re-calculating component for re-calculating the hash code of the previous frame of the visual data stream and the hash code of the corresponding audio window of the audio data stream; and a comparing component for comparing the derived hash codes with the re-calculated hash codes from the visual data stream and the audio data stream.

According to a further aspect of the present invention there is provided a computer program product for integrity verification of an audio-visual data stream, the computer program product including a computer readable storage medium having program instructions embodied therewith, the program instructions executable by a processor to cause the processor to: insert a watermark into a frame of the visual data stream and/or into an audio window of a corresponding audio data stream, wherein the watermark includes: a hash code of the previous frame of the visual data stream and a hash code of the audio window of the audio data stream wherein the audio window corresponds in time to the previous frame of the visual data stream.

According to a further aspect of the present invention there is provided a computer program product for integrity verification of an audio-visual data stream, the computer program product including a computer readable storage medium having program instructions embodied therewith, the program instructions executable by a processor to cause the processor to: run through a visual data stream and a corresponding audio data stream; extract a watermark in a frame of the visual data stream and/or an audio window of a corresponding audio data stream; derive from the watermark a hash code of the previous frame of the visual data stream and a hash code of the audio window of the audio data stream wherein the audio window corresponds in time to the previous frame of the visual data stream; and compare the derived hash codes with the re-calculated hash codes from the visual data stream and the audio data stream.

Figure 6:
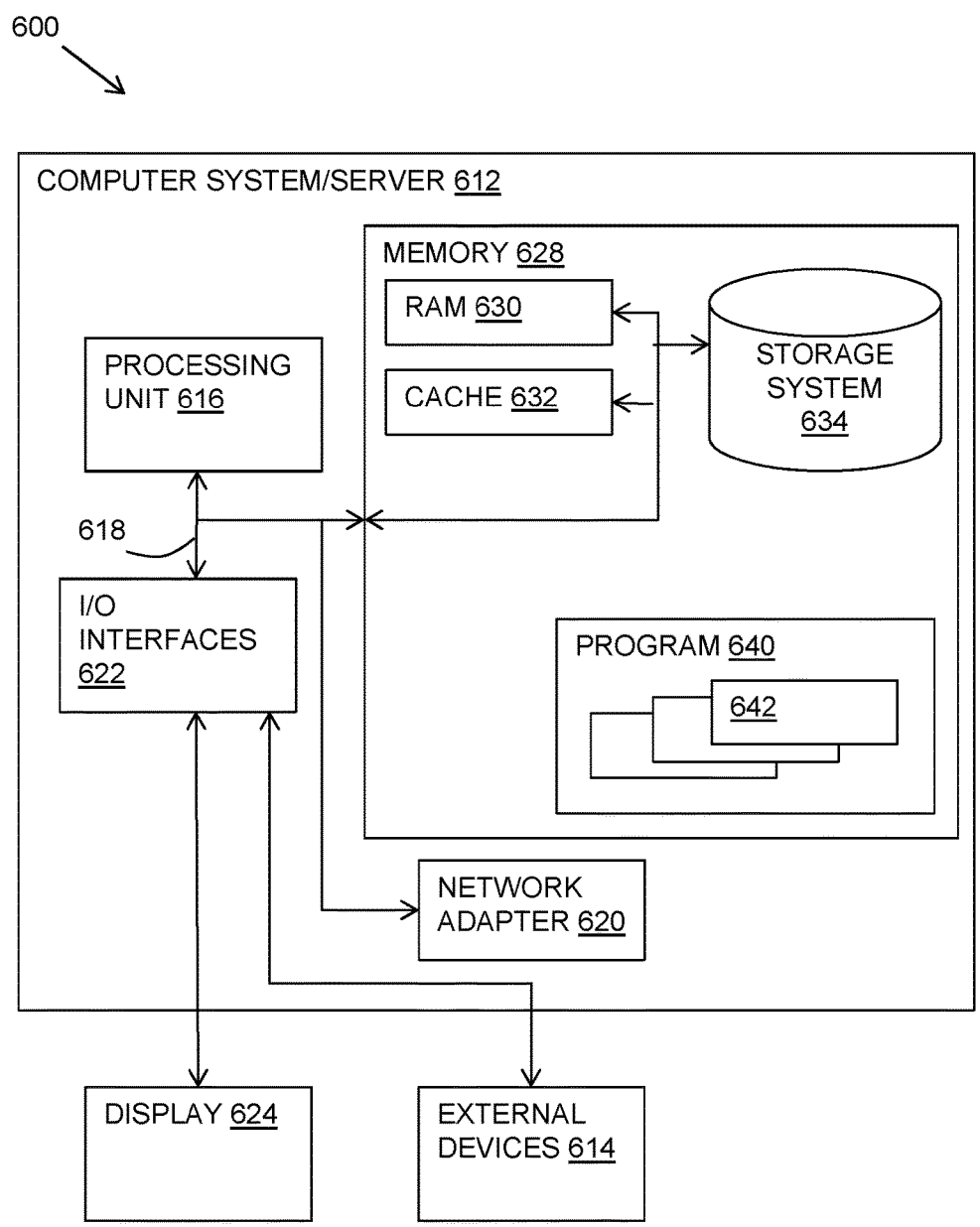
FIG. 6 is a block diagram of one embodiment of a computer system or cloud server in which one or more aspects of the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
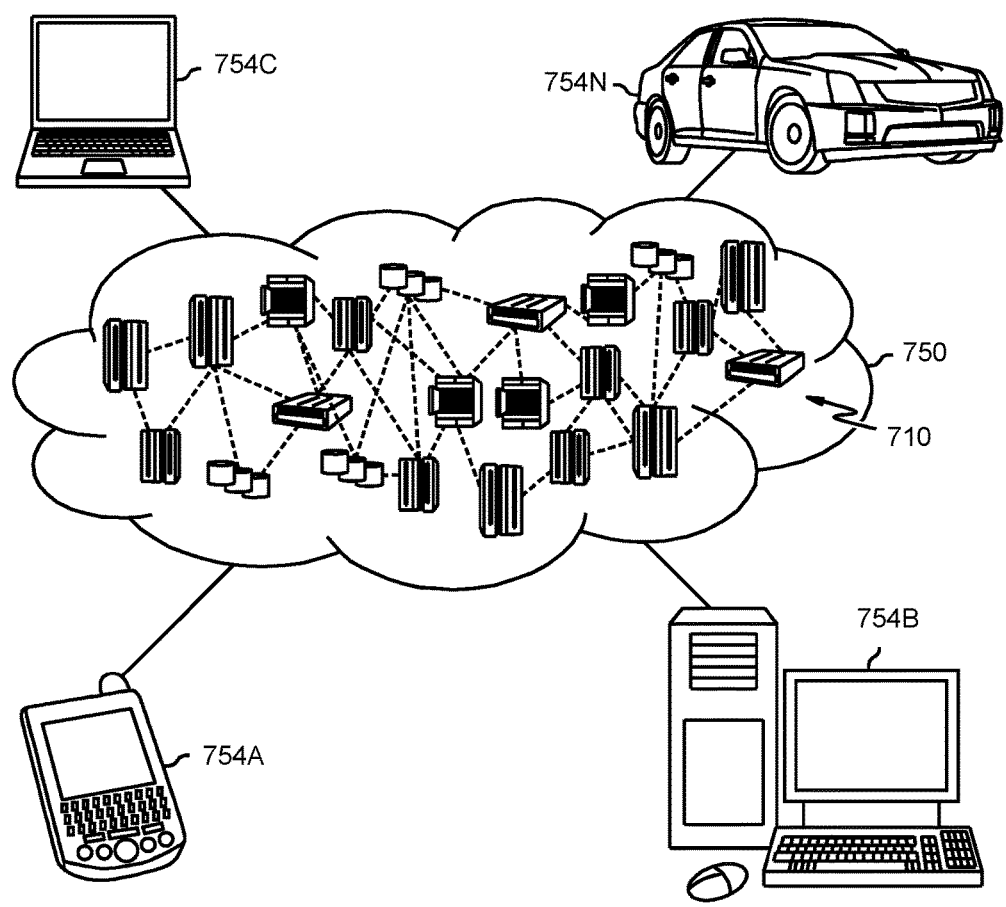
FIG. 7 is a schematic diagram of a cloud computing environment in which one or more aspects of the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
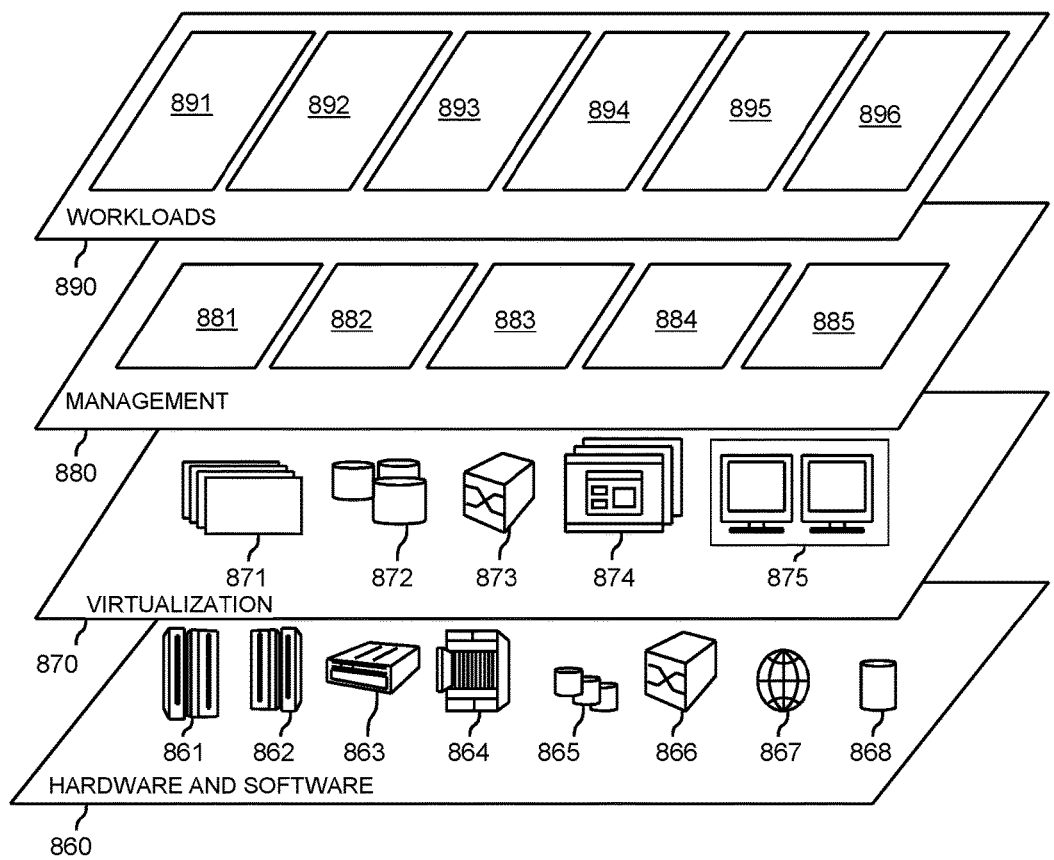
FIG. 8 is a diagram of abstraction model layers of a cloud computing environment in which one or more aspects of the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and audio-visual data stream integrity verification processing 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for integrity verification of an audio-visual data stream, comprising:
    inserting a watermark into a frame of the visual data stream or into an audio window of a corresponding audio data stream, wherein the watermark includes:
        a hash code of a previous frame of the visual data stream and a hash code of a previous audio window of the audio data stream wherein the previous audio window corresponds in time to the previous frame of the visual data stream; and
    the inserting of the watermark being with reference to one or more compression techniques used in transmission of the audio-visual data stream, and the inserting including limiting application of the watermark to a subset of an audio-visual field of display having required data to be transmitted for the frame.

2. The method as claimed in claim 1, further including inserting the watermark into both the frame in the visual data stream and the audio window in the corresponding audio stream.

3. The method as claimed in claim 1, further including combining the hash codes of the previous frame of the visual data stream and the corresponding audio window into a digital signature and embedding the digital signature in the visual data stream using digital watermarking or in the audio data stream using an audio watermark.

4. The method as claimed in claim 1, further including:
    providing an initial frame of a visual data stream sequence by capturing device firmware including metadata relating to the recording and including a final hash code of a previous visual data stream sequence.

5. The method as claimed in claim 1, further including:
    providing a closing frame in a visual data stream sequence including metadata relating to the recording and including a hash code of the last recorded frame.

6. The method as claimed in claim 5, wherein the closing frame includes a digital signature using a private key stored in a capturing device.

7. The method as claimed in claim 1, wherein the hash codes are formed over the time framed image and audio data.

8. The method as claimed in claim 1, wherein the hash codes are formed over a delta of data that has changed between visual frames or between audio windows.

9. The method as claimed in claim 1, wherein the watermark is inserted in a subset of the visual frame or audio window that includes required data to be transmitted, thereby not impacting compression of the visual data stream or audio data stream.

10. The method as claimed in claim 1, wherein the method is provided as a service in a cloud environment.

11. A computer-implemented method for integrity verification of an audio-visual data stream, comprising:
    running through a visual data stream and a corresponding audio data stream;
    extracting an inserted watermark in a frame of the visual data stream or an audio window of a corresponding audio data stream, the watermark having been inserted into the frame with reference to one or more compression techniques used in transmission of the audio-visual stream, the watermark being applied to a subset of an audio-visual field of display having required data to be transmitted for the frame;
    deriving from the watermark a hash code of the previous frame of the visual data stream and a hash code of the audio window of the audio data stream, wherein the audio window corresponds in time to the previous frame of the visual data stream; and
    comparing the derived hash codes with re-calculated hash codes from the visual data stream and the audio data stream.

12. A system for integrity verification of an audio-visual data stream, the system comprising:
    a memory; and
    a processor in communications with the memory, wherein the system performs a method comprising:
        inserting a watermark into a frame of the visual data stream or into an audio window of a corresponding audio data stream, wherein the watermark includes:
            a hash code of a previous frame of the visual data stream and a hash code of a previous audio window of the audio data stream wherein the audio window corresponds in time to the previous frame of the visual data stream; and
        the inserting of the watermark being with reference to one or more compression techniques used in transmission of the audio-visual data stream, and the inserting including limiting application of the watermark to a subset of an audio-visual field of display having required data to be transmitted for the frame.

13. The system as claimed in claim 12, wherein the system inserts the watermark into both the frame in the visual data stream and the audio window in the corresponding audio stream.

14. The system as claimed in claim 12, wherein the system combines the hash codes of the previous frame of the visual data stream and the corresponding audio window into a digital signature, and embeds the digital signature in the visual data stream using digital watermarking or embeds the digital signature in the audio data stream using an audio watermark.

15. The system as claimed in claim 12, further including:
    providing an initial frame of a visual data stream sequence by capturing device firmware including metadata relating to the recording and including a final hash code of a previous visual data stream sequence.

16. The system as claimed in claim 12, further including:
    providing a closing frame in a visual data stream sequence including metadata relating to the recording and including a hash code of the last recorded frame.

17. The system as claimed in claim 12, wherein the hash codes are formed over the time framed image and audio data.

18. The system as claimed in claim 12, wherein the hash codes are formed over a delta of data that has changed between visual frames or between audio windows.

19. The system as claimed in claim 12, wherein the watermark is inserted in a subset of the visual frame or audio window that includes required data to be transmitted thereby not impacting compression of the visual data stream or audio data stream.

20. The system as claimed in claim 12, wherein the system:
    runs through a received visual data stream and a corresponding audio data stream;
    extracts a watermark in a frame of the visual data stream or an audio window of a corresponding audio data stream, and derives from the watermark a hash code of the previous frame of the visual data stream and a hash code of the audio window of the audio data stream, wherein the audio window corresponds in time to the previous frame of the visual data stream;
re-calculates the hash code of the previous frame of the visual data stream and the hash code of the corresponding audio window of the audio data stream; and
compares the derived hash codes with the re-calculated hash codes from the visual data stream and the audio data stream.

\* \* \* \* \*